United States Patent Office 3,207,612
Patented Sept. 21, 1965

3,207,612
THIXOTROPIC COMPOSITION
Geoffrey Martin, Nashville, Tenn., assignor to Avco Corporation, Nashville, Tenn., a corporation of Delaware
No Drawing. Filed June 5, 1961, Ser. No. 114,663
5 Claims. (Cl. 106—69)

Ceramics use for the production of fixtures for locating metal members during various heat treatments are normally poured into molds to produce the desired reference surfaces and contours. Heretofore it has not been possible to apply ceramic mixes directly to a master model to produce such fixtures since compositions having the properties necessary for satisfactory application to such master models have not been known.

This invention relates to a composition of matter capable of such application and particularly to a composition having thixotropic properties. The invention is particularly concerned with a composition which has the apparent physical properties of damp sand and is incapable of being plastered by ordinary plastering techniques but which can be vibration troweled upon any suitable form and will set up solidly thereon.

The inveniton has particular significance to and is useful in the art of fabricating fixtures capable of securely holding the components of a metal honeycomb sandwich during brazing and heat treating. The outer or face plates of such a structure must be held in precise and accurate engagement with the edges of a metallic core of honeycomb construction while the assembly is subjected to extreme temperature variations. Fixtures of this type are described and claimed in my co-pending application with Estill Gene Music.

The composition of the present invention is made substantially entirely of fused silica, the particles of which are held together with a binder of colloidal silica. I have found that best results are obtained by intimately intermixing a very small amount of slaked line with the dry ingredients prior to intermixture with the colloidal silica.

An illustrative formula representing my invention is as follows (reference to screen sizes according to the U.S. Bureau of Standards Sieve Series):

|  | Weight | Percent |
|---|---|---|
| −200 finely ground fused silica | 6 lbs. 14 oz. (plus or minus ½ oz.). | 22.8 |
| −20 +50 fused silica grains | 11 lbs. 9 oz. (plus or minus ½ oz.). | 38.6 |
| −50 +100 fused silica grains | 11 lbs. 9 oz. (plus or minus ½ oz.). | 38.6 |
| Slaked lime | 10 grams (plus or minus ⅛ gram). | .073 |
| Colloidal silica | 3,500 cc | |

The finely ground fused silica noted in the above illustration is desirably of the type sold commercially as Glascast Flour. The silica grains may be of the type known as Glascast Grain sold by Pittsburgh Corning Company of Pittsburgh, Pennsylvania. The colloidal silica may be of the type known as Nalcoag Binder No. 50 sold by the Nalco Co. of Chicago, Illinois, comprising approximately 50% solids and 50% water.

It will be noted that all the ceramic particles in the above composition are silicon dioxide in the form of grains of fused silica in three categories of particle size, the two larger particle size categories bearing to the smaller particle size category an approximation ratio of 3:3:2 by weight. We have found this ratio to be quite necessary in order to give the desired properties with minimum amount of liquid binder and to yield a product least subject to cracking upon drying.

These dry ingredients and slaked lime are mixed, preferably in a power mixer, for approximately fifteen minutes. The binder is then added to the mixed dry ingredients and mixing is continued for approximately five minutes or until the "wet" mix shows signs of green strength. At this stage the mix has the apparent consistency of damp sand and is not flowable (except upon vibration). The material is then ready to apply to the desired mold shape.

The addition of slaked lime is for the purpose of controlling the set-up time of the green ceramic and of promoting the bonding of the particles together by combining with the other ingredients. It is believed that this binding is not only mechanical in character but also in part chemical with the formation of calcium silicate compounds.

It will be noted particularly that a ceramic material compounded as above described is thixotropic in character and has the appearance prior to use of a fairly solid damp aggregate which will not flow under ordinary conditions at room temperature. The material, however has the property of becoming sufficiently liquid to flow when subjected to vibration and can be vibration troweled directly upon a reference model of attitude varying from horizontal to near vertical since it "sets" quite firmly after it has assumed equilibrium.

This material, when mixed, may be vibration troweled with a minimum of "slumping" to any suitable base such as the forms upon which a mold or fixture for holding metal components during the time they are subjected to brazing or heat treating procedures. By "slumping" I mean the tendency of surplus ceramic to slag or run and result in an irregular wavy external surface after application. By vibration troweling I mean that the material may be placed upon a suitable trowel to which is secured or against which is placed a vibrator of any suitable type and the trowel pressed against the mold while being moved over appropriate guides. During this procedure the composition becomes fluid and flows in the spaces of the mold provided between the guides, filling the same entirely and immediately setting up into a semi-solid state.

Heretofore in the fabrication of jigs, fixtures and molds for holding metal components to be brazed together into honeycomb sandwiches, it has been necessary to fabricate special materials upon which or between which the components are held. These have customarily been graphite blocks or ceramic blocks. In the case of ceramic blocks it has heretofore been necessary to first make molds, with elevations and indentations the reverse of the master pattern, and to cast the fixture in such molds. With the composition of the present invention, however, these fixtures need not be cast into prepared molds but may be made by vibration troweling the composition directly upon or into the master pattern in attitudes varying from horizontal to vertical, thus forming a platen reflecting the exact shape and contour of such pattern. After being put in place, the composition sets up quickly, as noted above, and is dried and cured by appropriate methods, preferably at room temperatures for twenty four to forty eight hours. In some instances, heating elements are mounted in the space subsequently filled by the composition so that the ultimate product has these elements embedded therein. In any case it is desirable to apply heat to the composition of the platen and the temperatures raised step by step to about 1800 degrees F. Typical properties of materials so produced are as follows:

| | |
|---|---|
| Density | 96 lbs./cu. ft. |
| Compressive strength | 3115 p.s.i. |
| Bending stress (1" of thickness) | 578 p.s.i. |
| Thermal conductivity | B.t.u./sq. ft./hr./° F./in. |
| 300° F. | 2.7 (actual). |
| 600° F. | 3.4 (actual). |
| 900° F. | 3.95 (actual). |
| 1200° F. | 4.25 (projected). |
| 1500° F. | 4.4 (projected). |
| 1800° F. | 4.5 (projected). |
| Thermal shock resistance | Sample did not crack when water quenched from 1800°. |

This material has good green state characteristics and in this condition may be readily cut, ground, drilled or abrasively surfaced. The composition, being composed almost entirely of silica, has excellent resistance to cracking during drying, and is particularly adapted to use at high temperatures since it has a very low coefficient of expansion.

Having thus described my invention, I claim:

1. A composition of matter consisting essentially of a mixture of finely ground grains of fused silica the weight of which is in the proportion of three parts of silica grains between 20 and 50 mesh, three parts of silica grains between 50 and 100 mesh, and two parts of silica grains less than 200 mesh, slaked lime and a binder of colloidal silica, all intimately intermixed to form a high viscosity aggregate incapable of flowing without external influence.

2. A thixotropic composition consisting essentially of finely divided grains of fused silica of particle size of between 20 and 50 mesh and a substantially equal quantity by weight of finely divided grains of fused silica of a particle size of between 50 and 100 mesh, both being intimately intermixed with grains of fused silica of less than 200 mesh particle size, said solids comprising substantially the entire solids content of the composition, slaked lime and a binder of colloidal silica, the components being intimately intermixed to the consistency of a damp aggregate of solids.

3. A thixotropic composition consisting essentially of finely divided grains of fused silica of particle size of between 20 and 50 mesh and a substantially equal quantity by weight of finely divided grains of fused silica of a particle size of between 50 and 100 mesh, both being intimately intermixed with grains of fused silica of less than 200 mesh particle size, slaked lime and a binder of colloidal silica, the components being intimately intermixed to the apparent consistency of wet sand.

4. A dry, homogeneous, amorphous composition in solid state consisting of finely divided fused silica and a binder comprising the residue from an aqueous solution of colloidal silica from which the water has been removed, said composition having a density of approximately 96 lbs. per cubic foot, compressive strength in excess of 3000 lbs. per square inch and thermal conductivity of less than 5 B.t.u. per square foot area per hour per degree Fahrenheit per inch thickness with temperature ranges less than 1800° F.

5. A dry homogeneous, amorphous composition in solid state consisting of finely divided fused silica and a binder comprising the residue from an aqueous solution of colloidal silica from which the water has been removed, said composition having a density of approximately 96 lbs. per cubic foot, compressive strength in excess of 3000 lbs. per square inch and thermal conductivity of less than 5 B.t.u. per square foot area per hour per degree Fahrenheit per inch thickness with average temperatures less than 1800° F., said composition having a low coefficient of expansion.

References Cited by the Examiner

UNITED STATES PATENTS

| | | | |
|---|---|---|---|
| 2,942,991 | 6/60 | Smith | 106—69 |
| 2,949,375 | 8/60 | Reuter | 106—69 |
| 3,024,125 | 3/62 | Lee | 106—69 |

TOBIAS E. LEVOW, *Primary Examiner.*

JOSEPH REBOLD, *Examiner.*